March 19, 1935. H. O. SWOBODA ET AL 1,994,839
APPARATUS FOR TREATING MATERIALS
Filed Aug. 4, 1931 10 Sheets-Sheet 1

INVENTORS
Hans O. Swoboda &
William F. Metzger
by this attorneys
Byrnes, Stebbins, Parmelee & Blenko March 19, 1935.　　H. O. SWOBODA ET AL　　1,994,839
APPARATUS FOR TREATING MATERIALS
Filed Aug. 4, 1931　　10 Sheets-Sheet 2

INVENTORS
Hans O. Swoboda &
William F. Metzger
by their attorneys
Byrnes, Stebbins, Parmelee & Blenko

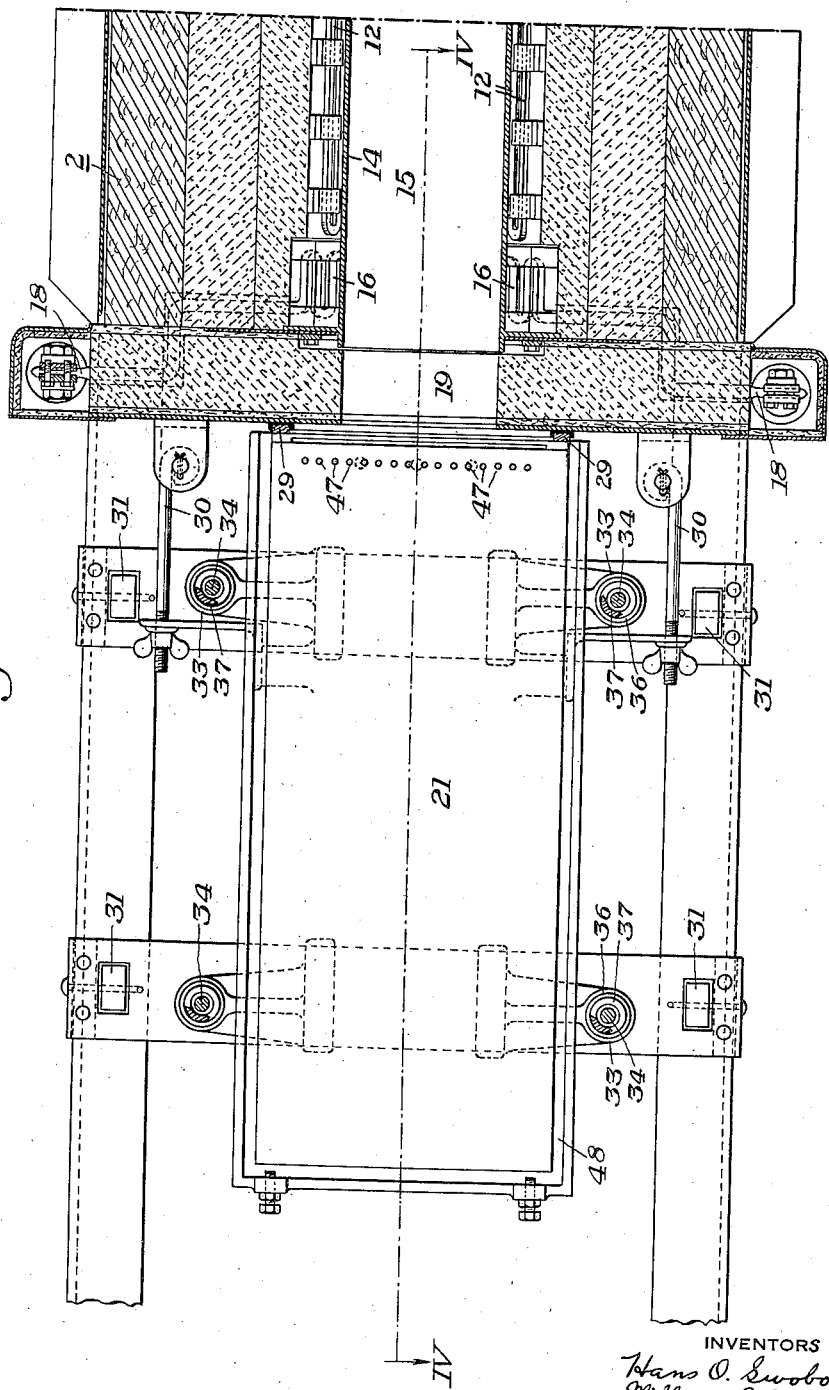

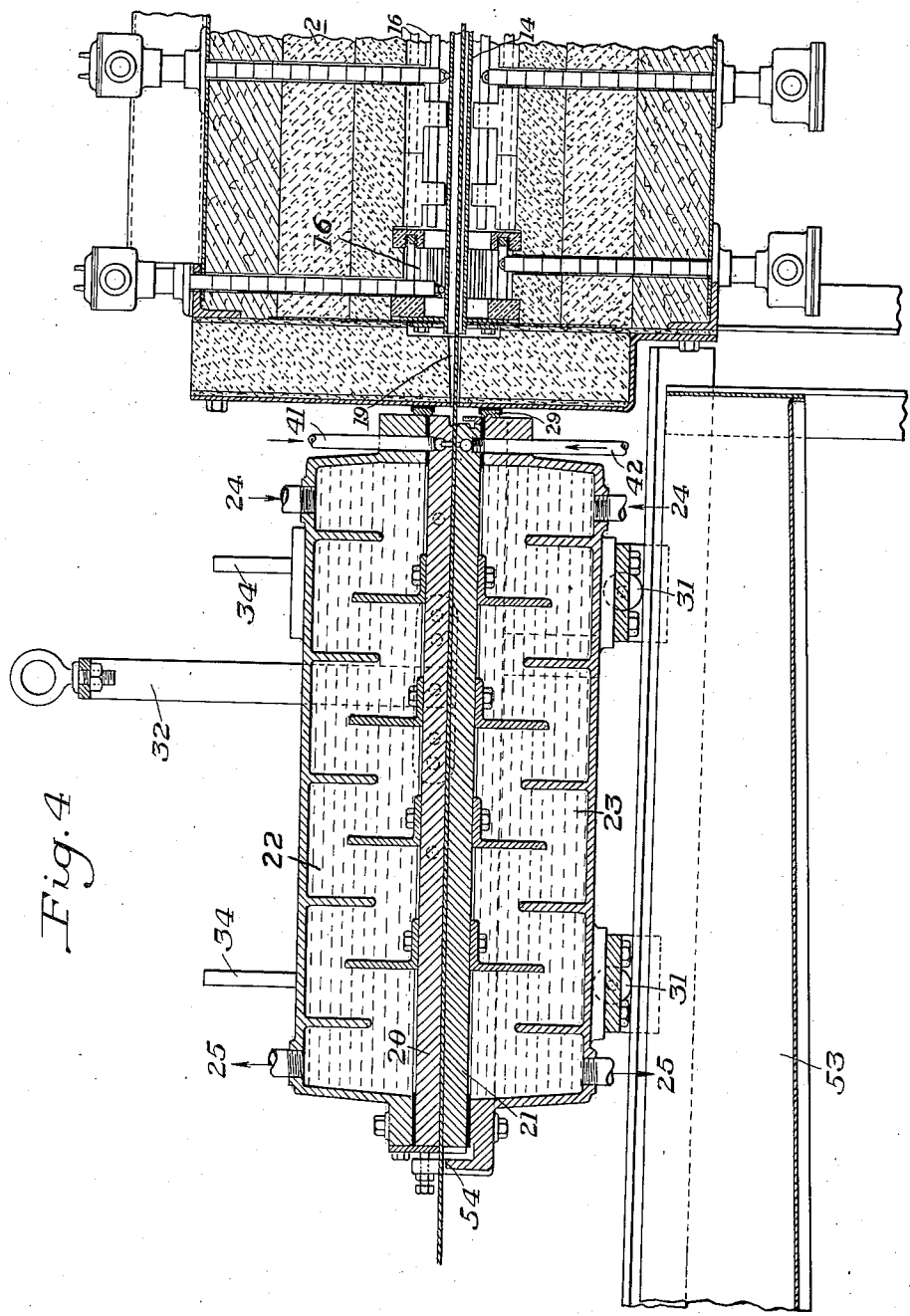

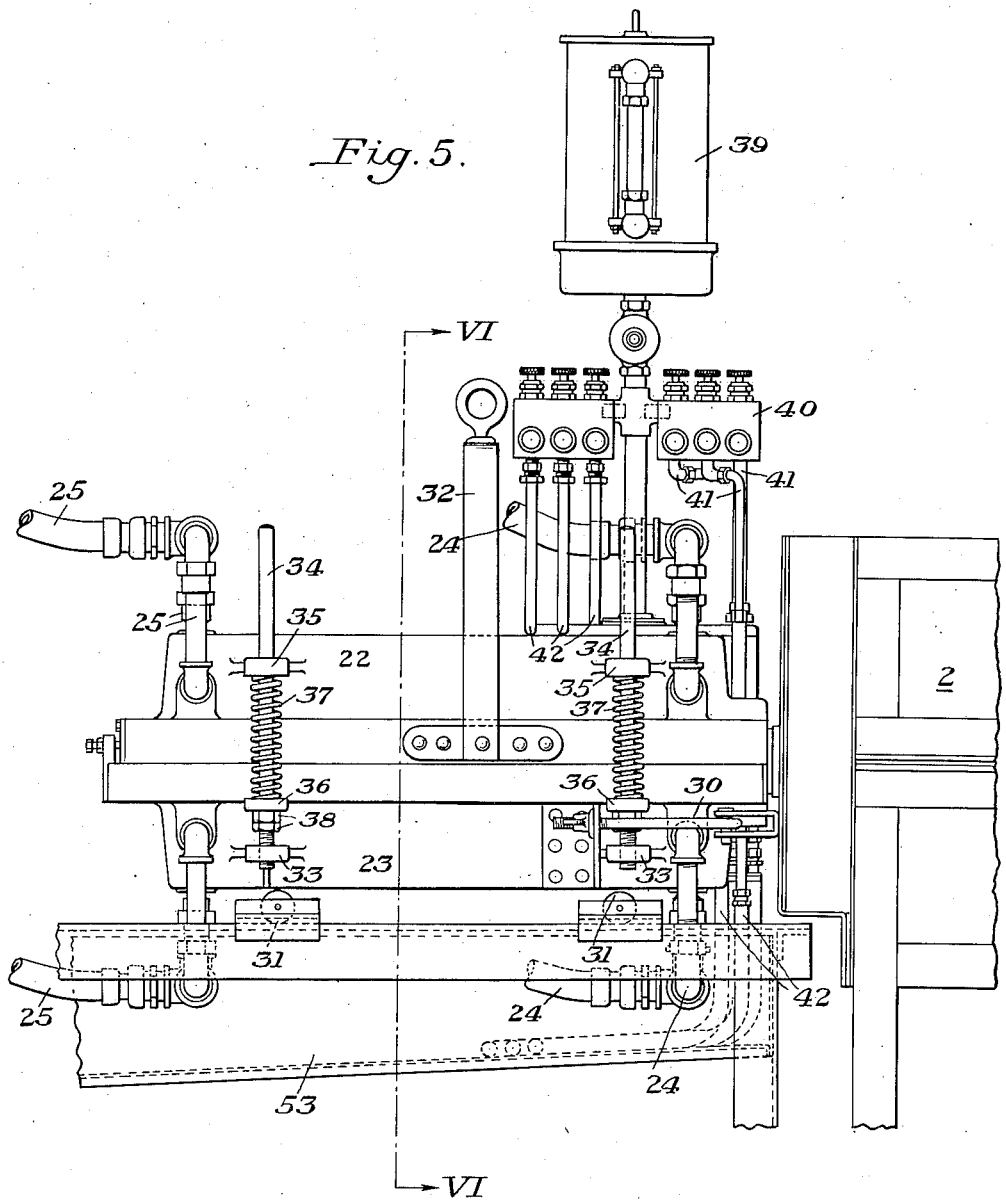

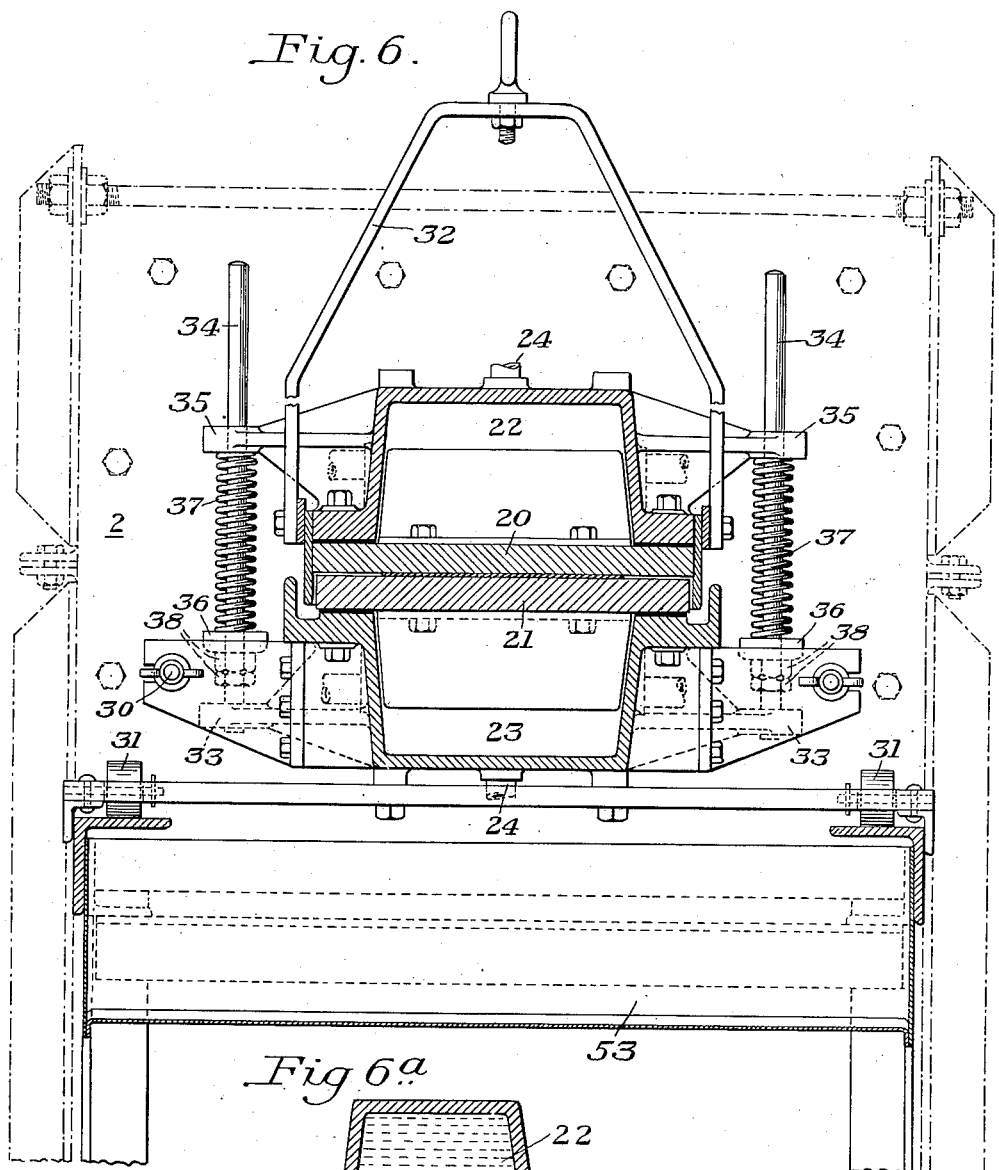
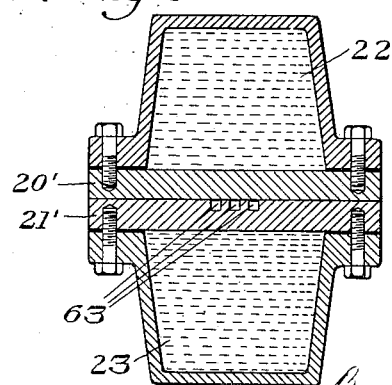

March 19, 1935.  H. O. SWOBODA ET AL  1,994,839
APPARATUS FOR TREATING MATERIALS
Filed Aug. 4, 1931  10 Sheets-Sheet 7
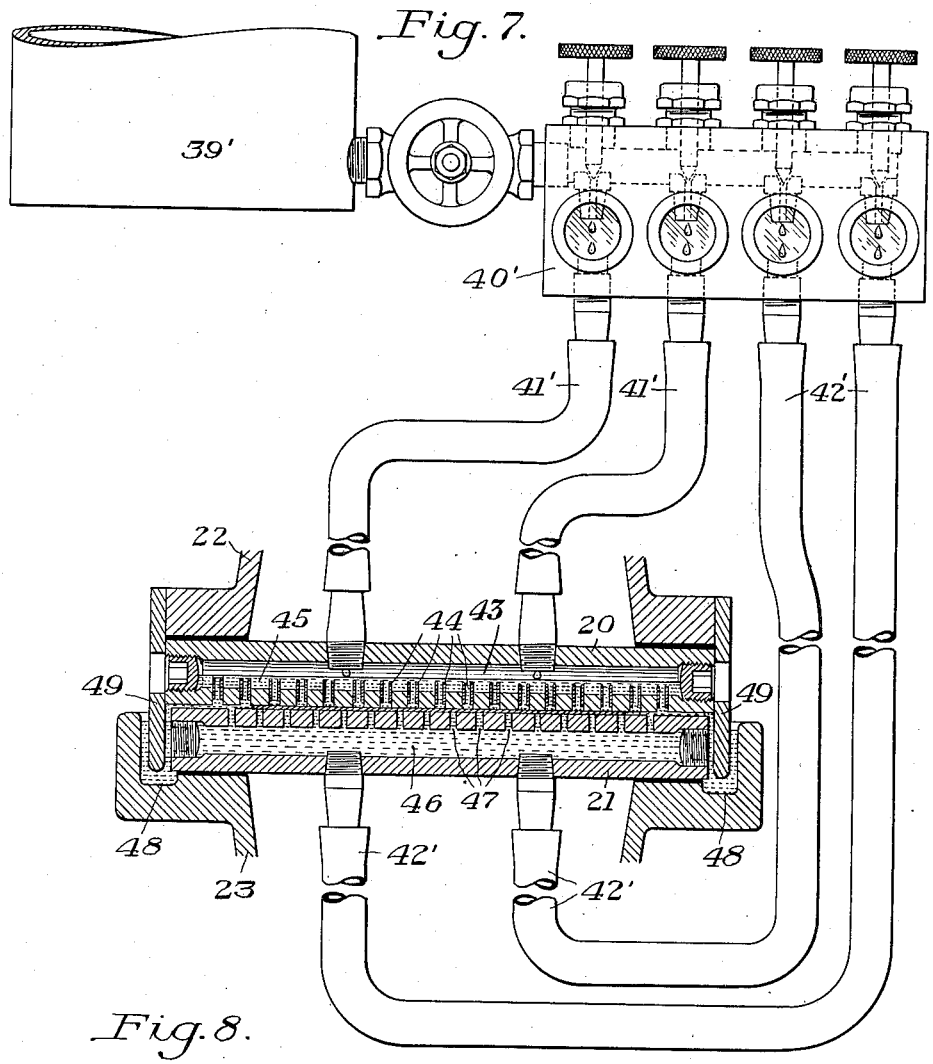
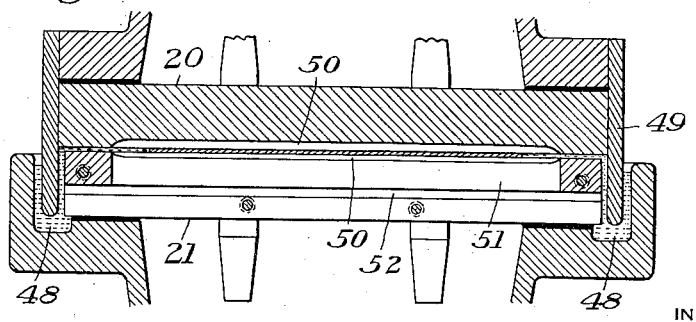
INVENTORS
Hans O. Swoboda &
William F. Metzger
by their attorneys
Byrnes, Stebbins, Parmelee & Blenko.

March 19, 1935.   H. O. SWOBODA ET AL   1,994,839
APPARATUS FOR TREATING MATERIALS
Filed Aug. 4, 1931   10 Sheets-Sheet 8

INVENTORS
Hans O. Swoboda &
William F. Metzger
by their attorneys
Byrnes, Stebbins, Parmelee & Blenko March 19, 1935.  H. O. SWOBODA ET AL  1,994,839
APPARATUS FOR TREATING MATERIALS
Filed Aug. 4, 1931  10 Sheets-Sheet 9

INVENTORS
Hans O. Swoboda &
William F. Metzger
by their attorneys
Byrnes, Stebbins, Parmelee & Blenko March 19, 1935.  H. O. SWOBODA ET AL  1,994,839
APPARATUS FOR TREATING MATERIALS
Filed Aug. 4, 1931   10 Sheets-Sheet 10
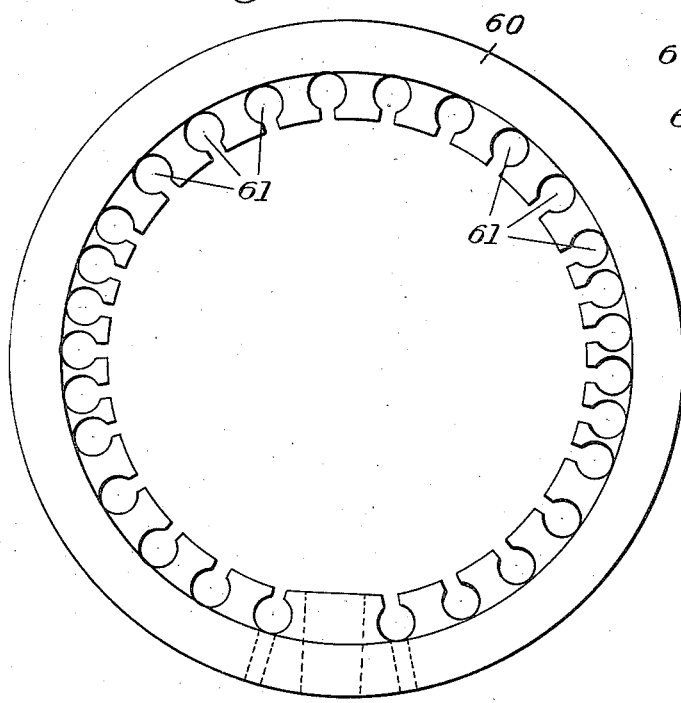
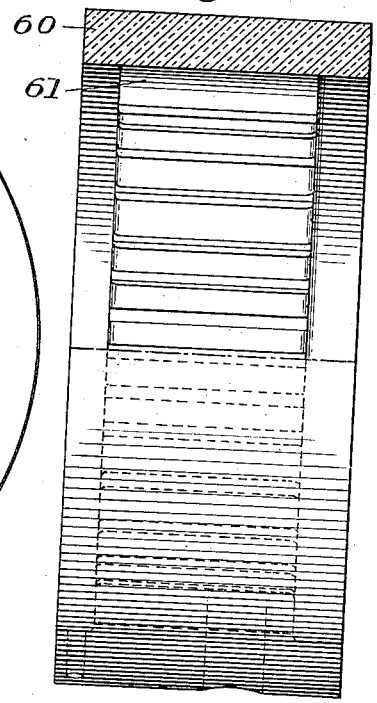
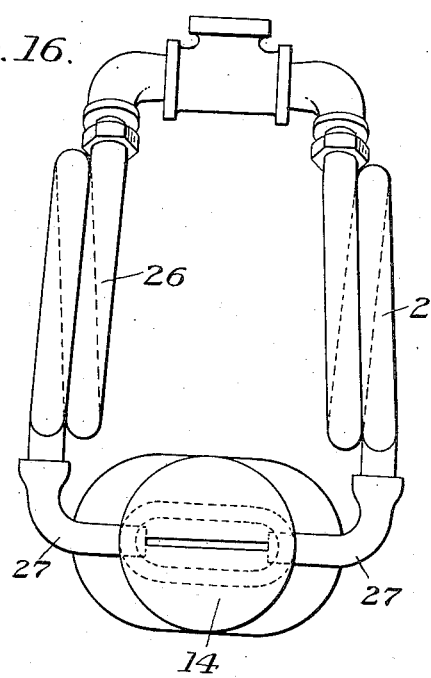
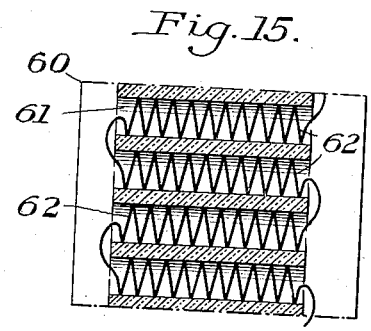
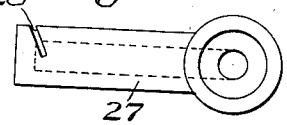

Patented Mar. 19, 1935

1,994,839

UNITED STATES PATENT OFFICE 1,994,839

APPARATUS FOR TREATING MATERIALS

Hans O. Swoboda, Edgewood, and William F. Metzger, Pittsburgh, Pa., assignors to H. O. Swoboda, Inc., Pittsburgh, Pa., a corporation of Pennsylvania Application August 4, 1931, Serial No. 555,050

24 Claims. (Cl. 266—3)

The present invention relates broadly to the art of material treatment, and specifically to the art of metal working, and more particularly to the handling or treatment of metallic bodies such as strips, sheets, rods, wires and the like.

In the art to which the present invention relates, it is desirable in many cases to subject material of the character referred to, and particularly ferrous materials such as high grade steel, to a special form of heat treatment effective for hardening the same. It has heretofore been proposed to accomplish such a treatment as, for example, in the case of razor blade steel, by passing a steel strip through a suitable furnace and thence into heat conducting relationship to chill or quench blocks by means of which the steel is hardened.

We have found that the proper hardening of materials of the character referred to requires accurate control of a number of different conditions, provision for the control of which has not heretofore been satisfactorily made. In order to obtain the most efficient hardening, it is necessary to subject the material to a chilling operation at such a time as the temperature of the material being treated is not appreciably below the maximum temperature to which it has previously been raised, and preferably during a time while the temperature is actually equal to the highest temperature or gradually increasing in temperature. It is therefore one of the objects of the present invention to provide apparatus effective either for maintaining the highest temperature or actually increasing such temperature, at or substantially at the time that the material is to be subjected to a chilling operation.

We have further found that to harden steel correctly and to preserve a bright surface finish at the same time, requires the heating of the steel under such conditions that both prevention of oxidation and chilling is performed under minutely controlled conditions. In accordance with the present invention these results are preferably accomplished by heating the material in a furnace having means for maintaining therein an inert atmosphere, and thereafter quenching or chilling the same under conditions such that any substantial amount of air is effectively excluded from the chilling or hardening zone. This constitutes a further advantage of the present invention, and is characterized by the complete performance of the treating operations with respect to the steel under non-oxidizing conditions.

Still another object of the invention is to provide an improved quench or chill block structure of such nature that the desired temperature conditions may be maintained on the quench plates, while permitting the delivery of a lubricant to the material passing between the same and while so controlling the supporting characteristics of at least one of the quench plates as to permit it to automatically compensate for changes in the thickness of the material undergoing treatment, while normally engaging the material with just sufficient pressure to effect the desired heat interchange without marring or otherwise injuring the finished surface of the material.

The invention further contemplates the provision of apparatus by means of which the temperature conditions to which the material is subjected may be so accurately and definitely controlled as to make possible the production of a product having the most desirable grain structure. To this end the invention preferably contemplates the utilization of a separate heater or heating means, herinafter designated as an outlet heater and effective for maintaining accurate temperature conditions in the material just prior to the chilling thereof, thus enabling the extent of grain growth and the subsequent refinement of the grain structure of the material to be accurately controlled.

Still another object of the invention is to provide an apparatus of the general character referred to which will be effective for handling material of appreciable width under such conditions that the resulting product will have the desired degree of flatness therein, the hardening of the material being accomplished under such conditions that warping, buckling, or twisting of the metal is effectively prevented.

Other objects of the invention will be apparent as the invention becomes better understood by reference to the specification and drawings forming a part thereof. In the drawings, which are illustrative only of certain preferred embodiments of the present invention, Figure 1 is a diagrammatic view for the purpose of illustrating characteristic temperature conditions maintained or effected in accordance with the present invention;

Figure 3 is a view partly in top plan and partly in horizontal section of a portion of the apparatus illustrated in Figure 2;

Figure 4 is a longitudinal sectional view along the line IV—IV of Figure 3;

Figure 5 is a detail elevational view, on an enlarged scale, of a portion of the mechanism illustrated in Figure 2, showing, however, a slightly modified embodiment of the invention;

Figure 6 is a transverse sectional view on the line VI—VI of Figure 5, looking in the direction of the arrows;

Figure 6a is a detail sectional view in part similar to Figure 6, but illustrating a modified embodiment of the invention;

Figure 7 is a detail view, partly in section, partly in elevation, and partly broken away, illustrating one method of effecting lubrication of the material being hardened;

Figure 8 is a view similar to Figure 7 illustrating the construction of the quench plates adjacent the inlet end thereof;

Figure 13 is a view partly in side elevation and partly in section of a modified form of outlet heater;

Figure 14 is an end elevational view of the outlet heater of Figure 13;

Figure 15 is a detail sectional view of a portion of the outlet heater;

Figure 16 is a detail elevational view of part of the means for supplying to and maintaining in the furnace an inert atmosphere; and Figure 17 is a detail plan view of a portion of the structure illustrated in Figure 16.

Figure 1:
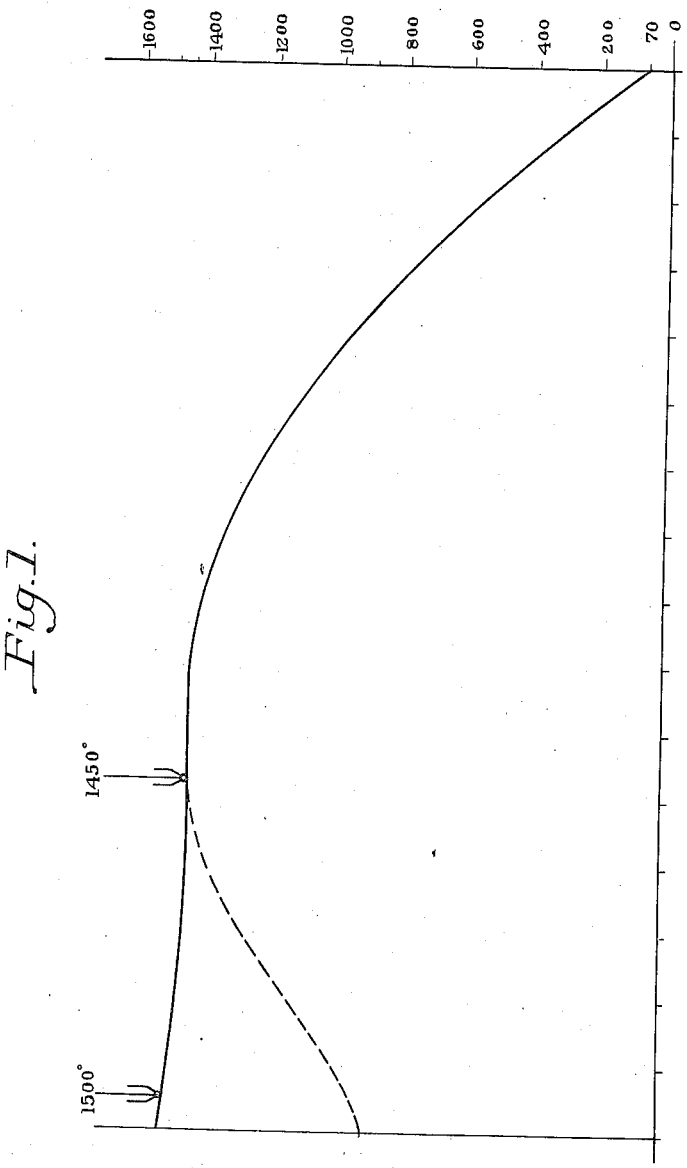

Referring first to the diagrammatic heat chart of Figure 1 wherein the ordinates represent temperature conditions in the material undergoing treatment and the abscissae are illustrative of units of length through which the material travels from the inlet end of the furnace to the outlet end thereof, we have illustrated the material as entering the heating zone at a temperature of approximately 70° and then gradually increasing in temperature during its travel through the furnace to a maximum temperature at a point spaced from the outlet, of 1450°. With ordinary types of furnaces, the material raised to this temperature, when approaching the furnace outlet, drops in temperature, and particularly at its edge portions in the case of strip, as indicated in dotted lines in Figure 1.

With heat treating apparatus as heretofore proposed, the temperature drop adjacent the outlet of the furnace has been sufficient to cool the material to a temperature in the neighborhood of 900° or lower, at which temperature it is subjected to a hardening operation. We have found, however, that material having a rapidly decreasing temperature when subjected to a chilling or hardening operation gives results which are decidedly inferior to material similarly treated while at its maximum temperature or while actually ascending in temperature. In Figure 1 we have illustrated the material as increasing in temperature from its maximum temperature within the main portion of the heating furnace, up to a temperature of 1500° at which temperature it is discharged from the furnace and subjected to a chilling or hardening operation. In this case, the material will actually have an ascending temperature characteristic when passing to the hardening zone, thus giving improved results of the character referred to.

It is to be understood that the temperatures hereinbefore mentioned are illustrative only and do not constitute any limitation as to temperatures which may actually be utilized in accordance with our invention, it being contemplated that the temperature conditions employed will vary with the characteristics of the material undergoing treatment.

Figure 2:
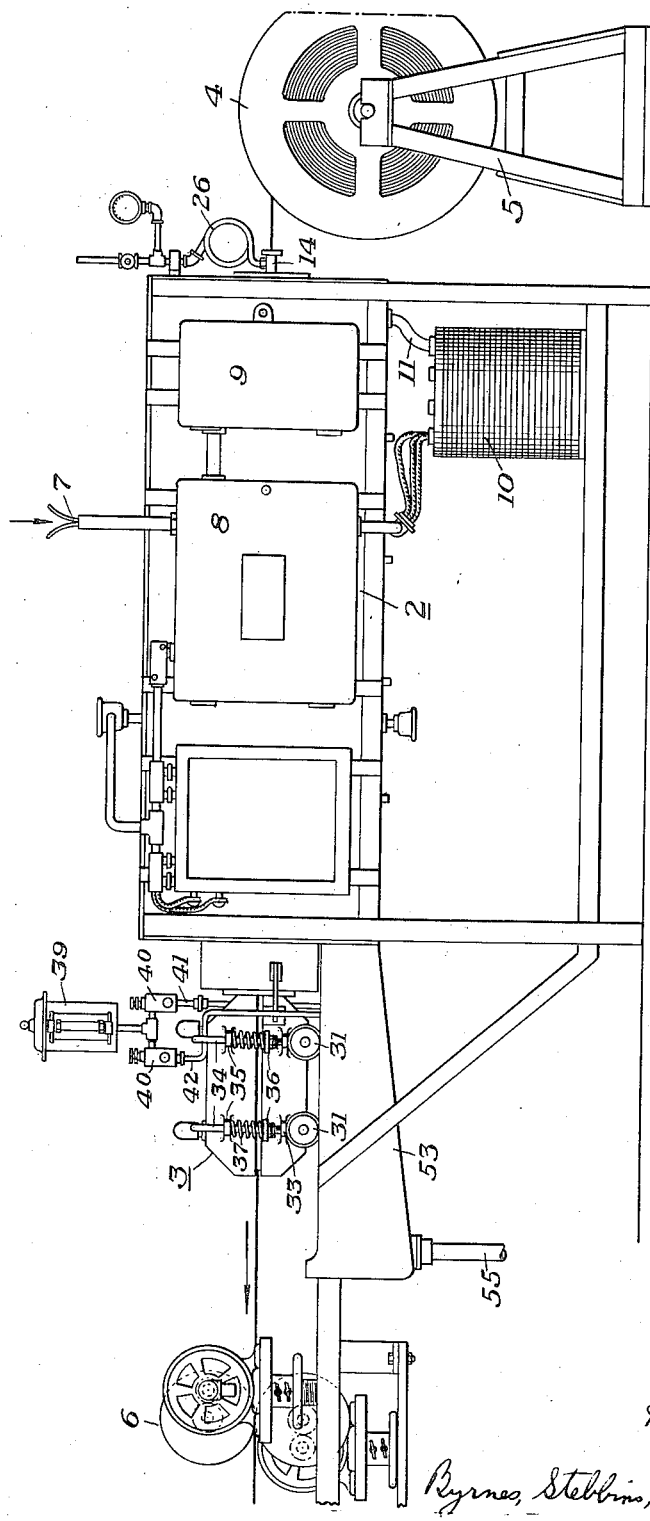
Figure 2 is a side elevational view of one form of heating and heat treating apparatus constructed in accordance with the present invention.

In Figure 2 there is illustrated one form of apparatus suitable for producing results of the character set forth, this apparatus including a furnace 2 constituting a heating zone and quench or chill mechanism 3 constituting a hardening zone. The material to be treated is illustrated as carried by a reel 4 supported in a suitable stand 5 adjacent the inlet of the heating zone, and as passing from the hardening zone in the direction indicated by the arrow in Figure 2 to suitable cleaning mechanism 6 which may comprise wipers, buffers, or the like. While we have herein illustrated the mechanism as adapted to the treatment of a single piece of material, it will be understood that any number of pieces may be simultaneously treated in side by side relationship.

The furnace is herein illustrated as being of the electrically operated type, current being supplied from a suitable source not shown, through a suitable connection 7 to a control board 8 from which it passes to a casing 9 containing a suitable contactor and thence through the control board to a transformer 10. The outlet terminals 11 of the transformer are connected in any desired manner to a suitable number and arrangement of heating units 12 disposed within the furnace, the particular construction in this regard constituting no essential part of the present invention so long as the structure is effective for heating the material to the temperature desired.

Extending lengthwise of the furnace and adapted to receive the material undergoing treatment, is a tube 14 forming a closed chamber 15 open only at its ends, the walls of the chamber being in heat conducting relationship to the heating units 12.

Figure 11:
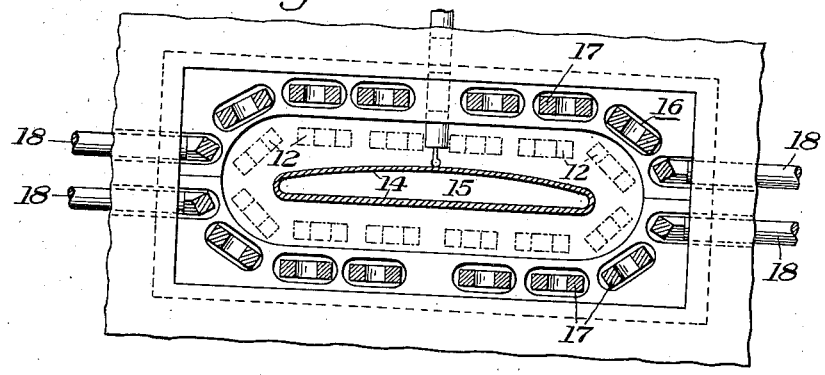
Figure 11 is a detail view, partly in section and partly in elevation, of the outlet heater utilized in accordance with the present invention.
Figure 12:
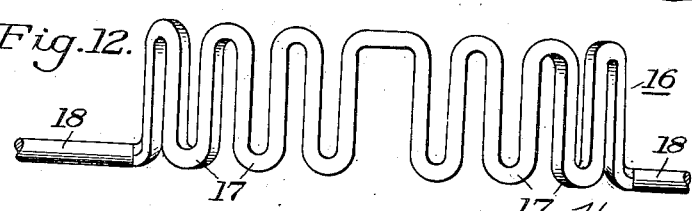
Figure 12 is a plan view of a portion of an outlet heater coil.

Adjacent the outlet of the furnace there is disposed an outlet heater 16 illustrated in detail in Figures 11 and 12. As herein shown, the outlet heater comprises units 17 having terminals 18 suitably connected to a source of electric current. The construction and arrangement of the units 17 is such that the temperature of the material leaving the furnace may either be maintained at its maximum temperature, or increased in temperature. This control may either be effected automatically by the use of suitable temperature responsive means, or manually in accordance with the indicated temperature conditions.

The material having been heated in the heating zone, is discharged from the furnace through an outlet opening 19, as illustrated more particularly in Figures 3 and 4, directly between an upper quench plate 20 and lower quench plate 21. These quench plates are herein illustrated as being provided with cooling chambers 22 and 23, respectively, each of the cooling chambers having an inlet 24 for cooling fluid and an outlet 25 leading to any desired point. By reason of this construction a suitable cooling fluid may be continuously circulated through the cooling chambers for maintaining the quench plates at the proper temperature. This cooling fluid may comprise air, water, brine or any other medium possessing the desired characteristics.

In Figure 2 of the drawings the tube 14 is illustrated as projecting beyond the inlet end of the furnace and as having a connection 26 to a suitable source of inert gas. In Figures 16 and 17 this construction is illustrated in detail as including nozzles 27 disposed adjacent opposite sides of the tube 14 and as having inwardly directed slots or openings 28 effective for discharging the inert gas into the tube in the direction of travel of the material therethrough. In this manner an inert atmosphere is maintained continuously within the chamber 15.

By reference more particularly to Figures 3 and 4 of the drawings, it will be noted that the quench or chill mechanism is maintained in sealed relationship to the outlet 19 of the furnace through the medium of a suitable packing 29, the furnace and sealing mechanism being held tightly in contact on opposite sides of the packing by means of clamping bolts 30, whereby the material may pass directly from the furnace, without contact with the atmosphere, into the space between the quench plates.

The construction and mounting of the quench plates constitutes an important feature of the present invention. In Figures 2 and 3, we have illustrated this mechanism as movably supported by suitable wheels 31, thus facilitating movement thereof bodily in a direction toward or away from the furnace. In addition to this mounting, we have indicated the upper quench plate and cooling chamber as carried by a yoke 32 adapted to be suitably suspended in any desired manner from an overhead support by means of which the maximum pressure, by reason of the weight of the upper quench plate and cooling chamber, exerted between the quench plates may be limited. Any desired number and arrangement of yokes 32 may be utilized whereby the pressure conditions throughout different portions of the quench plates may be varied.

In addition to the means just described, we preferably provide the lower cooling chamber 23 with laterally projecting brackets 33 (see Figure 6) in which are threaded the lower ends of rods 34 passing upwardly through similar brackets 35 projecting laterally from the upper cooling chamber 22. Carried by the rods 34 are spring cups 36 within which rest the lower ends of compression springs 37 surrounding the rods 34 and bearing at their upper ends against the undersides of the brackets 34. By adjusting the position of nuts 38 on the rods 34, the degree of compression of the springs 37 may be varied, thus causing the same to exert a greater or lesser lifting action on the upper quench structure. In this manner also the pressure conditions between the quench blocks may be continuously and accurately controlled and regulated.

We have found that desirable results are obtained by supplying to the material passing between the quench plates a suitable lubricant, and especially where the lubricant is so distributed as to insure substantially uniform delivery throughout the entire surface area of the material. This is particularly true in the case of relatively wide material and strips. The lubricant supplied in accordance with the present invention will preferably be of such nature as to crack as little as possible due to the heat of the strip, and thereby leave only a soft carbon deposit on the strip such as would not cause scratching thereof during passage of the strip between the quench plates.

In Figure 2 there is illustrated diagrammatically a form of oil supply mechanism including a reservoir 39 delivering through sight feed lubricators 40 to conduits 41 and 42 respectively. In Figure 2 of the drawings but two of the sight feed lubricators have been shown. In Figure 5, however, each of these lubricators is shown as being of triple construction, thus providing three outlets 41 leading to the upper quench plate and three outlets 42 leading to the lower quench plate. This construction, however, is subject to wide variation at the pleasure of the operator.

In Figure 7 there is shown a single reservoir 39' with a multiple sight feed cup 40' from which extend two conduits 41' to the upper quench plate and two conduits 42' to the lower quench plate, it being understood that the number and arrangement of the lubricators and conduits may be varied in accordance with the conditions of operation, size of equipment or character of lubricant.

Figure 9:
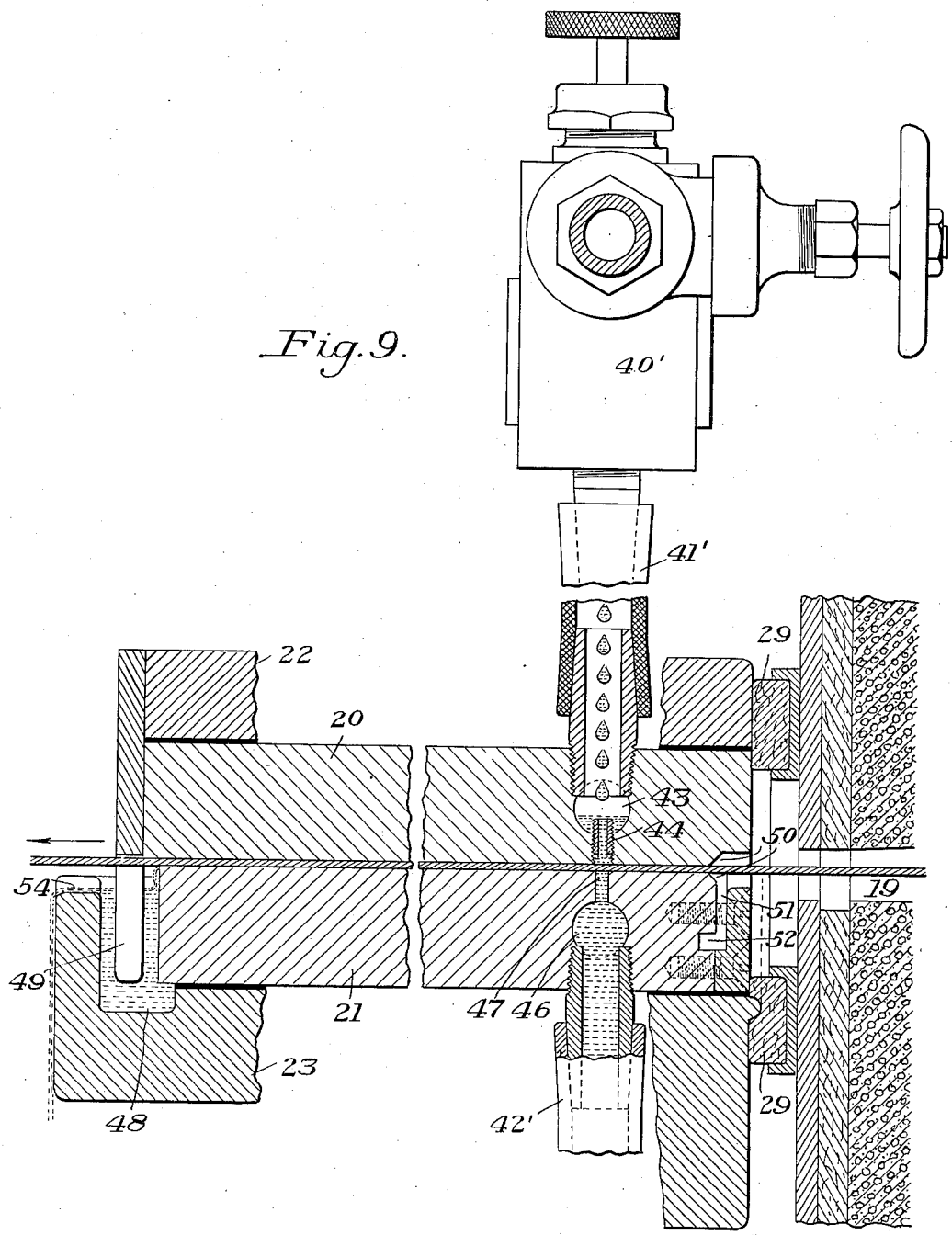
Figure 9 is a detail sectional view, on an enlarged scale, and partly broken away, illustrating one form of lubricating means.
Figure 10:
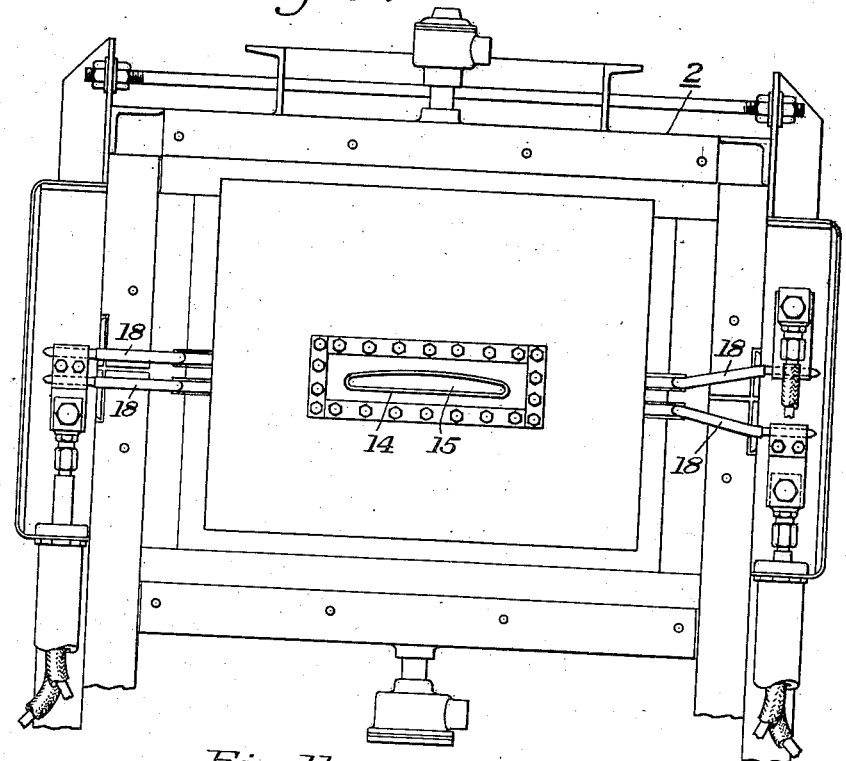
Figure 10 is an end elevational view of the outlet end of the furnace illustrated in Figure 2.

By reference more especially to Figures 7 and 9, it will be noted that the upper quench plate 20 is formed with a cross conduit or opening 43 into which the conduits 41 or 41' extend. This conduit is formed in its bottom wall with a number of threaded openings into each of which is threaded a lubricant feeder 44 having a calibrated opening therethrough. These lubricant feeders, as illustrated more particularly in Figure 7, are preferably all adjusted to a uniform height with the top ends thereof projecting above the bottom wall of the conduit and thus requiring the maintenance of a predetermined body 45 of lubricant within the conduit before the same is available for feeding the individual feeders. In this manner each of the feeders is supplied with lubricant under the same head and a uniform lubricant feed and distribution thus insured.

The bottom quench plate 21 is likewise provided with a cross conduit 46 into which project the connections 42 or 42'. The cross conduit 46 has its upper wall provided with a plurality of feeder openings 47 through which lubricant can pass only when the cross conduit 46 is completely full. Each of the cross conduits 43 and 46 may, if desired, be divided by a suitable number and arrangement of partitions (not shown) depending upon the number and arrangement of feeding conduits delivering thereto, thus making it possible to isolate any feeding conduit from any other feeding conduit and thus concentrate the delivery of lubricant to that zone through which the material is passing.

It will be apparent that the quantity of lubricant delivered varies in accordance with the setting of the adjustments at the sight feed oilers. Since it is difficult from a practical standpoint to so regulate these oilers as to feed the exact quantity required, it is desirable, as a matter of safety, to supply an excess of lubricant. A large portion of such excess lubricant is pulled along with the material during its travel through the space between the quench plates in the direction indicated by the arrow in Figure 9. This excess lubricant is collected in a spillway or channel 48 surrounding the lower quench plate and into which projects a baffle or plate 49 carried by the upper quench plate in such manner as to provide a seal extending peripherally of the quench mechanism, thus precluding possibility of air infiltration and insuring a maintenance of the desired inert atmosphere not only within the heating zone but within the hardening zone.

In Figure 8 the quench plates are illustrated as being formed with relieved portions 50 at their entering end, thus facilitating the passage of the material into the space between the same. This figure further illustrates a slot 51 formed in the upper surface of the bottom quench plate 21 intermediate the point of lubricant application and the furnace, whereby any lubricant having a tendency to travel backwardly toward the furnace is collected in the slot and discharged into a channel 52 delivering at its opposite ends into the spillway 48. In this manner the possibility of entry of lubricant into the heating zone wherein it might be cracked, is precluded. The cracking with any type of furnace might be of such amount as to produce an objectionable carbon deposit on the material to an extent sufficient to cause scratching either of the material or of the quench plates, and in the case of an electric furnace might be sufficient in amount to effect a short circuiting of the heating units or other connections.

Any excess lubricant from the spill-way is in turn collected in an overflow or drip pan 53, the channel 48 being provided with a depressed portion 54, as illustrated in Figure 9, through which the lubricant may flow to the drip pan and thence by a connection 55 be delivered to a suitable point, such as the reservoir 39 for re-use.

In accordance with a preferred embodiment of the invention, the construction and mounting of the quench plates is such that they will have a slight downward inclination in the direction of material travel therebetween, whereby the lubricant supplied will have a tendency to flow in a direction away from the furnace, thus further insuring against the possibility of lubricant entry into the heating zone.

In Figures 13 to 15 both inclusive there is illustrated a slightly modified form of outlet heater adapted to be utilized in accordance with the present invention. This heater as herein illustrated comprises a shell 60 having formed therein a suitable number and arrangement of openings 61 each adapted to receive a heating coil 62 as illustrated for example in Figure 15. While the number and arrangement of coils may be varied as desired, we have found that satisfactory results are obtained by so arranging the coils as to provide a greater heating effect adjacent the edge portions of a strip than at the portions remote therefrom, thus compensating for the tendency of the edge portions to more quickly lose their heat, and making it possible to maintain the edge portions at the full temperature desired.

It will be apparent that the construction of the quench plates as described is such as to maintain at all times a substantially uniform pressure on the material undergoing treatment, which pressure is subject to careful regulation in such manner that the strip may be held against buckling during the chilling operation. The provision of an outlet heater further cooperates in this respect in maintaining the edge portions at their full temperature, thus insuring delivery of a strip which is at a uniform temperature condition throughout its entire width. Without this full temperature of the edge portions, it has been found difficult, if not impossible, to prevent buckling between the quench plates.

We have above described the mechanism as particularly adapted for the treatment of substantially flat material such as strips. It is equally adaptable, however, to the treatment of material of other shapes such as rods and wires, or shapes of irregular sections. In Figure 6a there is shown a modified embodiment of the invention, in which the upper quench plate 20' is shown as being of substantially the construction heretofore described, while the lower quench plate 21' is illustrated as having formed in its upper surface a number of grooves or slots 63 each adapted to receive an individual article and subject the same to the desired cooling operation. In such cases it is possible to bolt the quench plates rigidly together, the cross sectional area of the slots as compared to the cross section of the material undergoing treatment usually being such as to make it unnecessary to permit relative movement between the quench plates. It is also possible with such a construction to omit the supply of lubricant, inasmuch as the wires or other material traveling in the grooves or slots is not subjected to such pressure conditions as to cause any appreciable friction.

From the foregoing description, it will be apparent that we have provided apparatus for treating material, characterized by a heating zone and a hardening zone of such nature that material at full temperature may be delivered from one zone to the other and treated under such conditions in both zones as to preclude oxidation or detrimental scale formation. This constitutes one of the edvantages of our invention.

A further advantage of the invention arises from the provision of a separate outlet heater or heating means by reason of which not only is it possible to maintain the full temperature desired at the outlet of the heating zone, but which is further effective for passing the material at an increasing temperature to the hardening zone and at the same degree of temperature throughout its entire cross section in a direction transversely thereof.

The invention has as a further advantage the provision of means for maintaining a sealed relationship between the heating zone and hardening zone while permitting ready movement of the quench or chill mechanism toward or away from the furnace.

Still further advantages arise from the provision of a quench or chill mechanism of such construction that a regulated or controlled pressure may be continuously applied to the material passing therethrough, it being obvious that the pressure should at all times bear a predetermined relationship to the thickness and speed of the material undergoing treatment.

Other advantages of the invention arise from the provision of means for lubricating the material while preventing the passage of lubricant into the heating zone, and for collecting the excess lubricant in such manner as to effectively maintain a seal for the hardening zone.

Other advantages of the invention will be apparent from the foregoing description, it being understood by those skilled in the art that changes in the construction and arrangement of the parts may be made without departing either from the spirit of our invention or the scope of our broader claims.

We claim:

1. In a material treating apparatus, a furnace constituting a heating zone, quenching means constituting a hardening zone movably supported relative to said heating zone, sealing means intermediate the two zones, means for supplying an inert atmosphere to the heating zone, and means for preventing air infiltration into the hardening zone.

2. In a material treating apparatus, a furnace constituting a heating zone, quenching means constituting a hardening zone movably supported relative to said heating zone, sealing means intermediate the two zones, means for supplying an inert atmosphere to the heating zone, and means for preventing air infiltration into the hardening zone, said last mentioned means comprising a liquid seal.

3. In a material heating apparatus, a furnace including main heating means and a separate outlet heater adjacent the furnace outlet, and means for passing strip material through said furnace said outlet heater being so constructed and arranged as to exert a greater heating effect adjacent the edge portions of the strip than adjacent the other portions.

4. In a material treating apparatus, a pair of quench plates, means for supplying lubricant to the space between said plates, and means for collecting said lubricant to form a liquid seal to prevent air infiltration to said space.

5. In a material treating apparatus, a pair of quench plates, means for supplying lubricant to a space between said plates, means for collecting said lubricant to form a liquid seal to prevent air infiltration to said space, and means for maintaining an inert gas atmosphere in said space.

6. In a material treating apparatus, a pair of quench plates, means for regulating the degree of compression exerted by said plates on material passing therebetween, and means for supplying lubricant uniformly to the surface of material moving in contact with a quench plate.

7. In a material treating apparatus, a pair of quench plates, means for regulating the degree of compression exerted by said plates on material passing therebetween, and means for supplying lubricant uniformly to the surface of material moving in contact with a quench plate, said means including a plurality of sight feed lubricators.

8. In a material treating apparatus, a plurality of quench plates each having a cooling chamber, and spring means for adjustably controlling the pressure between said plates, there being means for supplying lubricant to a space between said plates.

9. In a material treating apparatus, a plurality of quench plates each having a cooling chamber, and spring means for adjustably controlling the pressure between said plates, there being means for supplying lubricant to the space between said plates, together with means for collecting said lubricant and forming a seal for said space.

10. In a material treating apparatus, a furnace constituting a heating zone, quenching means constituting a hardening zone movably supported relative to said heating zone, sealing means intermediate the two zones, a tube extending through the heating zone to muffle the material being treated, means at the inlet end of said tube for blowing inert gas along the tube into the hardening zone, and means for preventing air infiltration into the hardening zone.

11. In a material treating apparatus, a furnace constituting a heating zone, roller-mounted quenching means constituting a hardening zone, sealing means intermediate the two zones, means securing the quenching means to the furnace, and means for preventing air infiltration into the hardening zone.

12. In a material treating apparatus, a furnace constituting a heating zone, roller-mounted quenching means constituting a hardening zone, sealing means intermediate the two zones, means securing the quenching means to the furnace, means for preventing air infiltration into the hardening zone, and means for blowing inert gas into the inlet end of the heating zone to provide an inert atmosphere in both said zones.

13. In a material treating apparatus, a pair of quench plates, the lower plate being provided with a lubricant collecting trough extending beneath the edge of the meeting faces of the plates and the upper plate being provided with a sealing flange depending therefrom to dip into said trough, and means for supplying lubricant to lubricate the material passing between said plates and to form a liquid seal in said trough to prevent air infiltration between said plates.

14. In a material treating apparatus, a pair of quench plates, the lower plate being provided with a lubricant collecting trough surrounding the lower plate beneath the edges of the meeting faces of the plates and the upper plate being provided with a sealing flange depending therefrom to dip into said trough, and means for supplying lubricant to lubricate the material passing between said plates and to form a liquid seal in said trough to prevent air infiltration between said plates.

15. In a material treating apparatus, a quench plate, said plate having a transverse lubricant channel, means comprising a conduit for delivering lubricant to said channel, and lubricant feeders within the quench plate for delivering lubricant from said channel to the material contacting surface of the quench plate.

16. In a material treating apparatus, a quench plate, said plate having a transverse lubricant channel, means comprising a conduit for delivering lubricant to said channel, and lubricant feeders within the quench plate for delivering lubricant from said channel to the material contacting surface of the quench plate, said lubricant feeders all extending upwardly within said channel to the same elevation.

17. In a material treating apparatus, a furnace constituting a heating zone, and quenching means constituting a hardening zone, said quenching means comprising a pair of quench plates, and means for supplying lubricant to the contacting faces of said plates, the lower quench plate being provided with a groove for preventing creeping of lubricant back into said furnace.

18. In a material heating apparatus, a furnace including main heating means and a separate outlet heater adjacent the furnace outlet, and means for passing strip material through said furnace, said outlet heater comprising a plurality of electrical heating units grouped to exert a greater heating effect adjacent the edge portion of the strip than adjacent the other portions of the strip.

19. In material treating apparatus, a tubular electric furnace, a hardening device provided with contact means immediately adjacent the outlet end of the furnace for chilling the material as it is discharged from the furnace, said furnace comprising electric resistance heating means concentrated adjacent the outlet end of the furnace for maintaining the temperature of the material until it is discharged to the hardening device, and means for substantially continuously advancing material through the furnace and hardening device.

20. In material treating apparatus, an electric furnace comprising heat insulating material, a tube extending therethrough, and electric resistance heaters constituting a main heating zone for raising the temperature of the material moving along the tube and an outlet heating zone of restricted extent for compensating for heat losses through the end of the insulating material, a hardening device immediately adjacent the outlet end of the furnace for chilling the material as it is discharged from said tube, and means for substantially continuously advancing material through the furnace and hardening device.

21. In material treating apparatus, an electric furnace comprising heat insulating material a tube extending therethrough, and electric resistance heaters constituting a main heating zone for raising the temperature of the material moving along the tube and an outlet heating zone of restricted extent for compensating for heat losses through the end of the insulating material, a hardening device immediately adjacent the outlet end of the furnace for chilling the material as it is discharged from said tube, sealing means between said tube and the hardening device for preventing the infiltration of air, and means for substantially continuously advancing material through the furnace and hardening device.

22. The combination defined in claim 19 in which the hardening device is provided with a plurality of quench plates as contact means immediately adjacent the outlet end of the furnace for chilling the material as it is discharged from the furnace.

23. In combination an electric resistance furnace, a hardening device provided with contact means immediately adjacent the outlet end of the furnace for chilling the material as it is discharged from the furnace, and means for substantially continuously advancing material through the furnace and hardening device, said electric furnace comprising heat insulating material and a tube extending therethrough whose cross-section is a flattened oval, there being an electric resistance heater in the discharge end of the heating furnace for compensating for heat losses through said end of the heating furnace.

24. The combination defined in claim 23 in which the bottom surface of the flattened oval is a substantially horizontal plane surface.

HANS O. SWOBODA.
WILLIAM F. METZGER.